Oct. 27, 1970

G. T. W. ORMROD ET AL  3,536,910

BEAM-CHOPPERS FOR USE IN SPECTROSCOPES AND LIKE INSTRUMENTS

Filed Oct. 25, 1967  2 Sheets-Sheet 1

INVENTORS
GEORGE THOMAS WALLACE ORMROD
WILLIAM ROBERT PATTERSON

BY
Cushman, Darby & Cushman
ATTORNEYS 3,536,910
BEAM-CHOPPERS FOR USE IN SPECTROSCOPES
AND LIKE INSTRUMENTS
George Thomas Wallace Ormrod and William Robert
Patterson, Runcorn, England, assignors to Imperial
Chemical Industries Limited, London, England, a corporation of Great Britain
Filed Oct. 25, 1967, Ser. No. 677,961
Int. Cl. H01j 39/34
U.S. Cl. 250—41.9                                    12 Claims

ABSTRACT OF THE DISCLOSURE

An instrument, e.g. a spectroscope and particularly a mass spectrometer having a molecular inlet system, which is to be used for examining a beam of matter or energy in the presence of unwanted matter or energy, which instrument is provided with (a) beam-modulating means comprising a solenoid driven vibrating reed beam-chopper, (b) a phase-sensitive detector or lock-in amplifier in association with the detection system of the instrument, and (c) means for locking in the frequency of the reference phase of the phase-sensitive detector or lock-in amplifier and the signal used to excite the solenoid of the beam-chopper to the frequency of vibration of the reed. Also, (i) a novel beam-modulating device for use in the instrument comprising a solenoid driven vibrating reed beam-chopper wherein the signal to the solenoid is an amplified alternating current transduced from the reed's vibrations at the same or preferably one-half the frequency thereof and in phase therewith, (ii) novel beam-chopper/transducer combinations for use in the beam-modulating device, and (iii) novel combinations of phase-sensitive detectors or lock-in amplifiers with the beam-modulating device including or excluding the beam-chopper/transducer part.

---

This invention relates to a mechanical device adapted to be mounted on any instrument in which a beam of energy or matter is to be examined in the presence of unwanted matter or energy, for the purpose in use of periodically interrupting, i.e. modulating, the flow of matter or energy in the beam.

The device is particularly suitable for use in a spectroscope, i.e. an instrument designed for the purpose of analysing the components of radiated matter or energy and characterised by having in conjunction with a source of said radiated matter or energy a means for isolating a desired spectral band of the matter or energy and a detector which may be, for example, a photographic plate or an electric charge detecting device. The means for isolating the desired spectral band may be prismatic, e.g. a prism or grating, where the spectroscope is designed for examining energy radiations, e.g. as in visible light, ultra-violet radiation or infra-red radiation. Alternatively, in many spectroscopes particularly designed for examining matter, e.g. as in a mass spectrometer, the matter is normally first converted to charged ions and the means for isolating the desired spectral band is suitably a magnetic field which deflects the line of travel of the charged ions to an extent according to the ratio of their mass to their charge.

The application of modulation to spectroscopic analysis allows the use of detectors based on A.C. principles: such detectors are generally preferred because of their inherent stability and ease of design and operation from the electronic viewpoint. It has been found particularly useful in spectrometry, however, as an aid to distinguishing the signal obtained from the emitted matter or energy under examination from interfering signals generated by unavoidable background emissions. For example, in instruments using molecular beam techniques, e.g. mass spectrometers provided with molecular beam inlet systems and operating under very high vacua, the problem of distinguishing the beam signal from the background signal (or noise) is particularly great as signal to noise ratios as low as 1:10 or even 1:100 are frequently met. Modulation of the beam signal allows for its easier detection in the presence of the background since a phase-sensitive or lock-in amplifier, which is tuned to the frequency of the modulated signal and which senses only those signals at the frequency at which it is tuned, may be built into the signal detector.

Many devices for mechanical modulation, beam-choppers as they are generally termed, are known. A favoured device, however, is a solenoid driven vibrating reed beam-chopper. This device consists of a vibratable piece of magnetisable material (the reed) which is caused to vibrate at its resonance frequency by electromagnetic means and is suitably shaped to provide a surface which periodically interrupts the beam when activated by the solenoid of the electromagnet. In practice, the reed of the device is caused to form one pole of an electromagnet and is so mounted and shaped that it is deflected from its rest position by the opposite pole on excitation of the solenoid. Vibration may be included by providing a make-and-break switch in the solenoid energising circuit or, preferably, by providing an alternating current to the solenoid. The frequency of the make-and-break action or of the alternating current is chosen to cause the reed to vibrate at its resonance frequency.

By way of example, one embodiment of the device is illustrated in FIG. 5 of the attached drawings, which is a side elevation thereof. It comprises an electromagnet having a pair of spaced magnetisable pole piece 3 and 4, conveniently but not necessarily in parallel configuration, connected by a magnetisable bar 5 on which is mounted the solenoid coil 6. To a free end of one of the pole pieces, and mounted and/or shaped so as to extend across and clear of one face of the other pole piece 4 is a vibratable magnetisable metal strip 1 called the reed. In its rest position, the reed does not touch the pole piece 4. Conveniently, pole piece 3 extends slightly beyond pole piece 4, thereby allowing the reed to be mounted in simple fashion on the top face of pole piece 4.

The reed is conveniently a rectangular metal strip bent up at one end to form a letter L. The upwardly bent arm 2 provides the beam interrupting surface. Alternatively, the strip may be T-shaped with the cross-piece, providing the beam interrupting surface, bent at angle to the plane of the arm.

The actual shape of the reed is, of course, not critical so long as it fulfils the beam-interrupting function desired of it, but its length and the material used to form it will determine its natural frequency of vibration. For example, an alternative form is that in which the beam-interrupting surface has its length parallel to the length of the arm, e.g. as shown in FIG. 5A. This form is particularly suitable for use with a divergent beam. It also allows for the beam-chopper to be mounted with the reed across the beam direction rather than normal thereto. This is useful where there is only limited longitudinal space in the instrument with which the beam-chopper is to be associated.

In the forms used hitherto, solenoid driven vibrating reed beam-choppers have suffered from disadvantages arising from the method of supplying the alternating current to the solenoid coil. The source of the current is usually an audio-oscillator and due to unavoidable environmental variations, the oscillator and reed tend to get out of phase thereby causing undesirable amplitude modulation in the reed's vibrations. Stable conditions can only be attained after long waiting periods, if at all.

Our invention provides a solenoid operated vibrating reed beam-chopper and solenoid energizing menas therefor in which the above described disadvantages are reduced or avoided.

According to the present invention we provide, for use in an instrument to be used for examining a beam of matter or energy in the presence of unwanted matter or energy, a beam-modulating device comprising a solenoid driven vibrating reed beam-chopper wherein the current supply to the solenoid is an amplified alternating current transduced from the reed's vibrations at the same or preferably one half of the frequency thereof and in phase therewith and optionally wherein there is also provision for supplying the alternating current transduced from the reed's vibrations, at the same frequency thereof and in phase therewith, as the reference signal to a phase-sensitive detector or lock-in amplifier associated with said instrument.

Our invention provides a solenoid driven vibrating reed beam-chopper having associated therewith means in operation activated by the reed to transduce the reed's vibrations to an alternating current, an amplifier the input of which is an electrical signal derived from the transducing means the output of which is fed to the solenoid coil and the amplification of which is such that its power output energises the solenoid to the extent required to cause the reed to vibrate, if necessary means for bringing the alternating current in phase with the reed's vibrations, preferably means for halving the frequency of the alternating current and optionally means for supplying the alternating current, at the same frequency as and in phase with the reed's vibrations, as the reference signal to a phase-sensitive detector or lock-in amplifier.

According to a further embodiment of our invention we provide modified solenoid operated vibrating reed beam-choppers for use in the beam-modulating device of our invention.

The device of our invention is especially suitable for use in spectroscopes, and particularly mass spectrometers, but, as stated above, it is also useful in any other instrument in which a beam of matter or energy is to be examined in the presence of unwanted matter or energy. The optimum benefit of the invention is obtained when the signal generated by the transducing means is used to supply the reference signal in a phase-sensitive detector, lock-in amplifier or like device associated with the detection system of the instrument. Used in this way, our invention provides the first means of locking in both the frequency of the signal of the phase-sensitive detector or lock-in amplifier and the frequency of the signal used to excite the solenoid of the beam-chopper with the frequency of the reed's vibrations.

The invention is now illustrated with reference to a preferred embodiment thereof and with the aid of the accompanying drawings in which.

Figure 5:
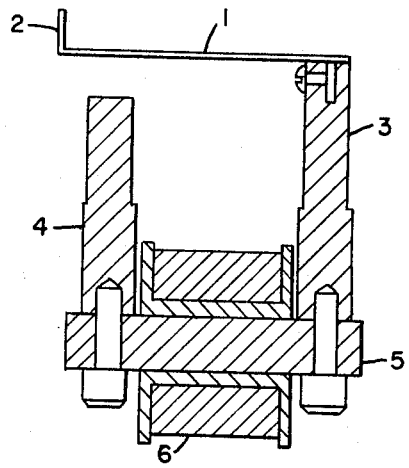
Figure 5A:
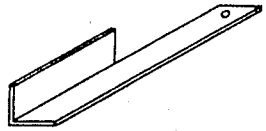
Figure 6:
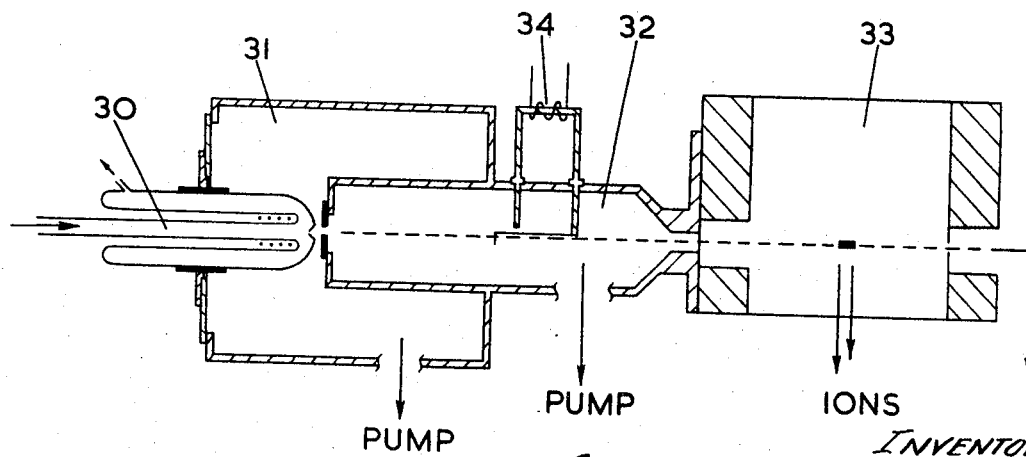

Other embodiments of our invention are shown in FIGS. 5, 5A and 6 wherein:

FIG. 5 is a side elevation of another beam chopper according to our invention.

FIG. 5A is an alternative embodiment of a beam-interrupting surface.

FIG. 6 is a mass spectrometer or like instrument fitted with a beam chopper according to our invention.

Figure 1:
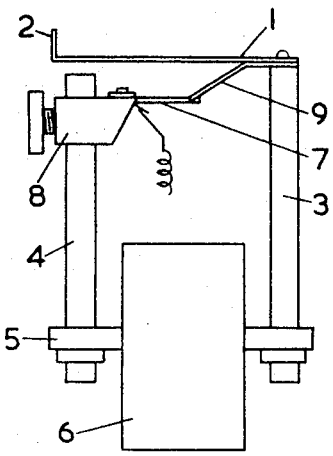
FIG. 1 is a side view of one embodiment of a solenoid-operated vibrating reed beam-chopper modified according to our invention.
Figure 2:
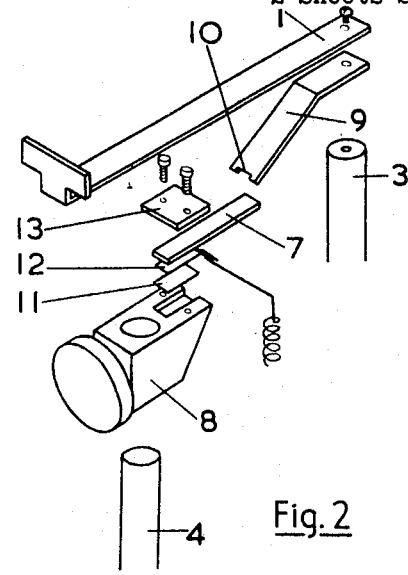
FIG. 2 is an exploded perspective view of one preferred arrangement of parts of the beam-chopper including the reed and transducing means associated therewith.

Referring to FIGS. 1 and 2, the solenoid-operated vibrating reed beam-chopper for use in our invention consists of a pair of parallel spaced magnetisable pole pieces 3 and 4 connected by a magnetisable bar 5 on which is wound a solenoid coil 6. Pole piece 3 is slightly longer than pole piece 4 and on its upper end is mounted a vibratable metal strip 1 referred to as the reed. This reed has its free end 2 turned up to provide the plain surface used for interrupting the beam. The pole pieces 3 and 4 and conducting bar 5 are preferably of Mumetal because of its high magnetic permeability and low hysteris combined with a hardness similar to that of stainless steel. A suitable alternative material is nickel. The magnetisable bar 5 with its coil 6 are preferably demountable so that the coil may be removed during any baking step that the device is to be subjected to.

In the device illustrated in the drawings, the means of transducing the reed's vibrations to an alternating current is a strain gauge. Most preferably, the strain gauge is in the form of a strip 7 of piezo-electric material coated on opposite faces with an electrical conductor, for example Piezoxide (registered trademark) which is a ceramic piezo-electric strain gauge form of transducer. Piezo-electric ceramic strain gauge forms of transducers are preferred because they can tolerate the high temperatures, e.g. up to 250° C., required when a spectroscope is baked prior to use. Solenoid-operated vibrating reed beam-choppers having piezo-electric strain gauge means for transducing the reeds vibrations are believed to be novel and of particular use in our invention.

Other strain gauge forms of transducer may be used, if desired, however, but are unlikely to be so resistant to high temperatures. Pick-up coil transducers may also be used but these latter may have to be shielded or removed during any baking step and are generally less attractive than strain gauges.

Another alternative is to use a capacitor, one of whose plates is formed by or attached to a surface of the reed thereby producing a capacitance varying at the frequency of the reed, in combination with means for converting this varying capacitance to an alternating current or E.M.F. However, this is not as preferable as a transducer which, suitably operated by the reed, generates an alternating E.M.F. directly.

A further alternative transducing means comprises a light source, a photo-electric cell activated by said light source and means for interrupting the light falling on the photo-electric cell at a frequency corresponding to the reed's vibrations. The interrupting means may be, for example, a suitably shaped part of the reed, or a piece attached to the reed. This further alternative has the advantage of requiring no mechanical load upon the reed.

In the drawings, the piezo-electric strip 7 is mounted on the shorter pole piece 4 and contact between it and the reed is effected through a sensor 9 which in operation acts to transmit faithfully the reed's vibration to the piezo-electric strip. This is conveniently an angled metal strip which is clamped between the reed and the pole piece 3 and shaped such that it vibrates with the reed and has a free end which bears on the free end of the piezo-electric strip. To ensure continuous contact with the piezo-electric strip it is useful to provide the free end of the sensor with a slot 10 in which the piezo-electric strip may fit so that there is positive location.

As an alternative to clamping the sensor between the reed and the pole piece, the sensor may be brazed, or otherwise attached, to the lower face of the reed. This gives the advantage of reducing the number of individual parts making up the device, thereby facilitating its assembly in the spectroscope or other instrument.

Referring to FIGS. 1 and 2, the piezo-electric strip is conveniently mounted on the shorter pole piece 4 by means of a clamp 8 which is slidable on the pole piece and held in any desired position by suitable locking means, e.g. a set screw. The piezo-electric strip may be fitted in a recess formed in the clamp and held in place by a retaining plate 13 which is screwed, or otherwise held, down on it. If the clamp is formed of conducting material, one face of the strip is insulated from the clamp e.g. by insertion of mica foil 11 or other, preferably bakeable, insulating material. Electrical contact is then made with the under face of the piezo-electric strip adjacent the insulating material e.g. by means of a metal foil 12 and electrical contact with the other face can then be established conveniently either via the sensor 9 and the longer pole piece 3, or through the shorter pole piece 4 via the retaining plate and the clamp.

In an alternative arrangement, the retaining plate 13 may be formed of insulating material and adapted to be mounted on the underside of the clamp 8. It may then be provided with a groove into which is mounted a flexible lead 12 and the piezo-electric strip 7. Electrical contact with the other side of the piezo-electric strip may then be made by the clamp (if formed of conducting material) or by other means as desired. This arrangement allows for easier mounting of the piezo-electric strip.

As an alternative to the arrangement shown in the drawings, the piezo-electric strip may, if desired, be clamped or otherwise attached to the reed itself so that it flexes with the reed's movements. This arrangement avoids the need for a sensor but tends to interfere with the reed's natural vibratiton characteristics.

Referring to the electrical circuitry of the device, the alternating signal generated by the transducing means is fed to an amplifier. The amplifier output is fed to the solenoid. The amplifying strength of the power amplifier must be such as to provide from said alternating signal an output adequate to energize the solenoid to a sufficient extent to cause the reed to vibrate.

Whether the transducer is mounted on the reed itself or separately as particularly described, the signal it produces might be found to be out of phase with the reed's vibrations. In such cases, it will be necessary to incorporate a phase corrector in the circuit to resolve this phase difference. Also, where a ceramic piezo-electric transducer is used, signals of very high impedance result and it will be preferable to introduce an impedance converter between it and the amplifier. It is also preferable to introduce a frequency divider in the circuit between the transducer and the solenoid coil so that the freqeuncy of the input to the solenoid is one-half the frequency of the reed's vibrations. This improves the efficiency of the device and allows the use of less powerful amplifiers. The offset of frequency division is preferably simulated by rectification.

Figure 3:
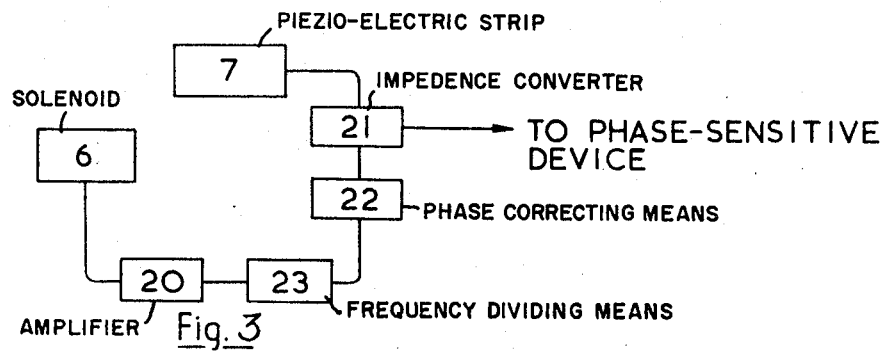
FIG. 3 is a diagrammatic representation of one suitable electrical circuit for the device.

Thus, in short, the electrical apparatus required in combinatiton with the solenoid-driven vibrating reed chopper containing transducing means according to our invention will comprise essentially (i) an amplifier 20 (see FIG. 3) having an input from the transducer and whose amplifying strength is sufficient to provide from said alternating current an output adequate to energize the solenoid 6 to a sufficient extent to cause the reed to vibrate, (ii) if necessary, phase correcting means 22 positioned between the transducer and the solenoid for ensuring that the current energizing the solenoid is in phase with the reed's vibrations, (iii) preferably frequency dividing means 23 for halving the frequency of the current obtained from the transducer before feeding it to the solenoid and (iv) in the preferred case where the transducer is a ceramic piezo-electric device, an impedance converter 21 on the input side of the amplifier. The frequency dividing means is preferably a rectifier. Phase-correction is preferably effected before rectification.

The optimum benefit of our invention is obtained when the signal generated by the transducing means of our modified solenoid operated vibrating reed beam-chopper is used to supply the reference signal in a phase-sensitive detector, lock-in amplifier or like device associated with the detection system of the instrument, e.g. mass spectrometer, in which said beam-chopper is mounted. In this case, the reference signal for the detector is preferably taken from the output of the impedance converter or phase corrector although it may be taken from any other point before rectification.

Figure 4:
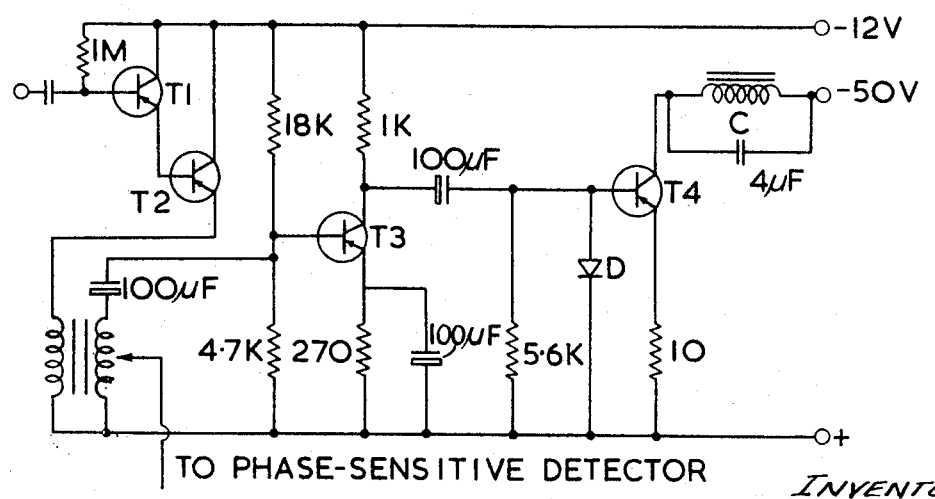
FIG. 4 shows a suitable electrical circuit in detail.

A detailed circuit suitable for use in our device is shown in FIG. 4. The signal from the transducer is fed to an impedance converter comprising two emitter-followers $T_1$ and $T_2$ (suitably type BCZ11 transistors) in super alpha pair, or Darlington, configuration. These provide an impedance converter input stage. The output is fed to a 1/1 transformer which can give a phase reversal if desired and therefore provides a limited form of phase correction, this being all that was required for the device illustrated and circuit employed. The use of the transformer is optional. (The super alpha pair configuration of $T_1$ and $T_2$ is preferred since the output to the transformer so obtained provides a signal of low noise and low distortion, particularly suitable for use as the reference signal for a phase sensitive detector.)

The transformer output is fed to a single stage transistorised temperature-compensated amplifier, for example using a type OC72 transistor $T_3$, and the amplified signal is passed to a switching cricuit, for example using an OC35 transistor $T_4$ which is protected, if desired, by use of a diode D. This switching (or rectifying) circuit acts as the frequency divider. Negative feedback control of the gain of this stage may be provided by a variable resistor (not shown) mounted in series with the 10 ohm resistance shown on the earthed side of $T_4$. The resultant signal is fed to the solenoid coil C which preferably has in parallel a condenser to offset the back E.M.F. of the coil and the capacitance of which depends upon the natural frequency of vibration of the reed and the impedance of the coil. If several reeds of different natural frequencies are to be used in conjunction with the coil, this condenser is preferably replaced by a bank of condensers of appropriate capacitance. By way of example, we have found that a capacitance of 2 to 4 microfarads is required for a reed vibrating at 149±1 c.p.s. in parallel with a 120 ohm relay coil of 2,500 turns of 40 S.W.G. copper wire. A meter (not shown) may be incorporated in series with the coil to facilitate control of the energising current. Power for the unit may be supplied from a mains-driven full wave rectifying system with Zener stabilisation.

Where the device is to be used in a mass-spectrometer or like instrument operating under a pressure other than atmospheric, particularly under high vacuum conditions, a convenient method of mounting is to insert the pole pieces 3 and 4 through the wall of the system. Sealing may be effected, for example, by the use of individual gold ring seals. The chopper mechanism comprising the reed, sensor and transducer may then be installed subsequently through a convenient side port. Alternatively, both pole pieces may be mounted on a single removable plate adapted to be mounted in the wall of the instrument. Part of a mass spectrometer or like instrument having a beamed system and fitted with a beam-chopper according to our invention is illustrated in FIG. 6. The instrument comprises an inlet 30 leading to a series of collimating chambers 31, 32 and 33, pumped to successively higher vacua. The ion source is provided in the third chamber. In the drawing, the beam-chopper, generally designated as 34, is shown mounted in the second collimating chamber. This is generally found the most convenient although it may, if desired, be mounted in the first. Mounting it in the chamber containing the ion source is unnecessarily difficult.

In operation, the beam-chopper is mounted in the spectrometer and, if necessary, the coil is then removed while the whole instrument and beam system are baked under high vacuum. The coil is then mounted. We have found that the chopper may be activated by switching on the amplifier, set for full energising current. When activation has been achieved, normally after a few seconds, it may be found necessary to reduce the power to the amplifier to give simple harmonic vibration within the elastic limits of the reed.

Although the device is particularly suitable for association with a mass spectrometer having a molecular beam inlet system, it may also be used in conjunction with any other spectroscope or other instrument in which a beam of matter or energy is to be examined in the presence of unwanted matter or energy. For example, it may be used with a normal mass spectrometer, mounted near the source, for the purpose of aiding examination of the emissions of interest in the presence of background. It is particularly applicable to Knudsen cell mass spectrometry.

Its lack of sensitivity to temperature and pressure variation, which normally cause slight frequency variations in the reed's vibration, make the device of our invention particularly suitable for use in conjunction with lock-in or phase-sensitive detection apparatus since the reference frequency is inherently locked in to be modulation frequency. Furthermore, its reliability in unusual environments e.g. of temperature and pressure, its simplicity, light weight and ease of miniaturisation make it especially attractive for use in space vehicles, for example in the mass spectrometric analysis of planetary atmospheres where its use could eliminate possible background signals arising from the spacecraft's internal atmosphere.

Other applications lie in the fields of examination of plasma beams or beams of hot ions by spectrometry.

What we claim is:

1. A beam modulating device for use in an instrument having a phase-sensitive detector or lock-in amplifier associated with a detection system of the instrument and wherein the instrument is to be used for examining a beam of matter or energy in the presence of unwanted matter or energy and comprising in combination:
   a solenoid driven vibrating reed beam chopper including means for transducing the reed's vibrations to an alternating current;
   means in circuit for amplifying the said alternating current and feeding it to said solenoid in phase with the reed's vibrations; and
   means in circuit for supplying the alternating current at the same frequency as and in phase with the reed's vibrations as the reference signal to said phase-sensitive detector or lock-in amplifier associated with the detection system of said instrument.

2. A beam modulating device as claimed in claim 1 having means in circuit for halving the frequency of said alternating current or for rectifying said alternating current for supply to the solenoid.

3. A beam modulating device as claimed in claim 1 having an impedance converter in the circuit between the transducing means and the amplifier.

4. A beam modulating device as claimed in claim 3 in which the impedance converter comprises two emitter follower transistors in super alpha pair relationship.

5. A beam modulating device as claimed in claim 1 wherein said transducing means is a ceramic piezo-electric strain gauge.

6. A solenoid driven vibrating reed beam chopper as claimed in claim 5 including a sensor which vibrates with the reed, said sensor operatively associated with said transducing means to activate the transducing means.

7. A solenoid driven vibrating reed beam-chopper as claimed in claim 6 which further comprises a pair of spaced pole pieces of magnetisable material, a bar of magnetisable material, said pole pieces being connected at their lower ends by said bar of magnetisable material, a solenoid coil removably mounted on said bar, a vibratable magnetisable metal reed carried at the upper end of a first of said pole pieces, said reed in rest extending across the top face of a second of said pole pieces but being spaced from it and the shape of said reed being such that it provides a beam interrupting surface, and a ceramic piezo-electric strain gauge mounted on the second pole piece, said strain gauge being in positive contact with said sensor in operation and adapted to vibrate with the reed and to transmit said vibrations to the strain gauge.

8. A solenoid driven vibrating reed beam-chopper as claimed in claim 7, wherein the sensor is an angled metal strip one end of which is mounted between the first pole piece and the lower face of the fixed end of the reed so that in operation it vibrates with the reed, and the free end of which extends away from the face of the reed and positively engages the ceramic piezo-electric strain gauge whereby in operation it transmits the reed's vibrations to said strain gauge.

9. A solenoid driven vibrating reed beam-chopper as claimed in claim 7 including a clamp slidably mounted on the second pole piece and holding said strain gauge, said clamp being provided with means for locking it in any desired position on the pole piece.

10. An instrument having a detection system wherein the instrument is designed for the purpose of examining a beam of matter or energy in the presence of unwanted matter or energy, which instrument is provided with beam modulating means comprising:
    a solenoid driven vibrating reed beam chopper including a ceramic piezo-electric strain gauge which in operation is activated by the reed to transduce the reed's vibrations to an alternating current;
    a phase-sensitive detector or lock-in amplifier in association with the detection system of said instrument; and
    means for locking-in the frequency of the reference phase of said phase-sensitive detector or lock-in amplifier and the signal used to excite the solenoid to the frequency of vibration of the reed.

11. An instrument as claimed in claim 10 which is a spectroscope.

12. An instrument as claimed in claim 11 which is a mass spectrometer provided with a molecular beam inlet system.

References Cited

UNITED STATES PATENTS

| | | | |
|---|---|---|---|
| 1,849,271 | 3/1932 | Bower | 331—155 |
| 2,829,259 | 4/1958 | Foner et al. | |
| 2,875,353 | 2/1959 | Cavalieri et al. | 331—156 X |
| 3,020,455 | 2/1962 | Reifel | 335—252 X |
| 3,093,743 | 6/1963 | Inderwiesen | 331—156 X |
| 3,347,615 | 10/1967 | Staunton | 350—269 |

ARCHIE R. BORCHELT, Primary Examiner

A. L. BIRCH, Assistant Examiner

U.S. Cl. X.R.

250—105; 331—155; 350—269